(12) United States Patent
Perry (10) Patent No.: US 7,248,341 B2
(45) Date of Patent: Jul. 24, 2007

(54) APPARATUS AND METHOD FOR OSCILLATING A TRANSMITTED LASER BEAM OF LIGHT WITHIN THE FIELD OF VIEW (FOV) OF A LIGHT RECEIVING SYSTEM

(75) Inventor: Gavin John Perry, Valley View (AU)

(73) Assignee: Tenix Lads Corporation Pty Ltd, Mawson Lakes (AU)

( * ) Notice: Subject to any disclaimer, the term of this patent is extended or adjusted under 35 U.S.C. 154(b) by 112 days.

(21) Appl. No.: 10/466,261

(22) PCT Filed: Jan. 28, 2003

(86) PCT No.: PCT/AU03/00089

§ 371 (c)(1), (2), (4) Date: Dec. 4, 2003

(87) PCT Pub. No.: WO03/064970

PCT Pub. Date: Aug. 7, 2003

(65) Prior Publication Data

US 2004/0074296 A1    Apr. 22, 2004

(30) Foreign Application Priority Data

Feb. 1, 2002    (AU)    .................................... PS0220

(51) Int. Cl.
*G01C 3/08* (2006.01)
(52) U.S. Cl. .................................................. 356/4.01
(58) Field of Classification Search ................ 356/4.01
See application file for complete search history.

(56) References Cited

U.S. PATENT DOCUMENTS 3,215,033 A * 11/1965 De Vries et al. .............. 353/51

(Continued)

FOREIGN PATENT DOCUMENTS

| JP | 06137813 A | * | 5/1994 |
| SE | 0102084-1 | * | 7/2001 |
| WO | WO 02/42792 A1 | | 5/2002 |
| WO | WO 02/099505 A1 | | 12/2002 |

OTHER PUBLICATIONS

Derwent Abstract Accession No. 2002-675685/73, V07, CN 1189626 A (Shanghai Precision Optical Instr Inst) Aug. 1998—abstract.

(Continued)

*Primary Examiner*—Thomas H. Tarcza
*Assistant Examiner*—Luke D. Ratcliffe
(74) *Attorney, Agent, or Firm*—Sand & Sebolt (57) ABSTRACT

An apparatus and method for the measurement of water depth between a water surface and water bottom and adapted for mounting on an aircraft flying above the water surface. The apparatus includes a transmitter and a receiver of laser light. The laser light is reflected from a secondary mirror to a primary mirror and to the water where it is subsequently reflected both from the water surface and the water bottom. The primary mirror then collects these reflections where they are then reflected to a receiver to be processed for subsequent analysis. So as to scan across the water surface the primary mirror is oscillated around a major axis generally transverse to the aircraft flying direction as well as parallel to the aircraft direction to compensate for the aircraft movement, the reflections recorded in a temporal fashion. The secondary mirror also dithers or scans the laser across the primary mirror to provide a higher resolution scan as the beam is oscillated across the water due to the oscillation of both the primary and secondary mirrors.

20 Claims, 5 Drawing Sheets

U.S. PATENT DOCUMENTS

| | | | |
|---|---|---|---|
| 4,277,167 A | | 7/1981 | Eppel |
| 4,518,254 A | | 5/1985 | Penny et al. |
| 4,754,151 A | * | 6/1988 | Billard .................. 250/574 |
| 5,585,632 A | * | 12/1996 | Hull et al. .............. 250/334 |
| 6,997,568 B2 | * | 2/2006 | Jurica et al. ............ 359/876 |

OTHER PUBLICATIONS

Derwent Abstract Accession No. 85-262191/42, SU 1150476 A (Belinskii) Apr. 15, 1985—abstract.

* cited by examiner

APPARATUS AND METHOD FOR OSCILLATING A TRANSMITTED LASER BEAM OF LIGHT WITHIN THE FIELD OF VIEW (FOV) OF A LIGHT RECEIVING SYSTEM

The present invention relates to an improved apparatus and method for measurement of water depth and land height and in particular one that provides a smaller spacing between laser soundings than is currently achieved by existing systems.

BACKGROUND OF THE INVENTION

Laser Airborne Depth Sounder (LADS) systems are used to measure water depth, i.e. the distance between a water surface and the bottom located beneath the surface. This depth measuring capability may be extended to also measure the height of land, and it is understood that the following descriptions that refer to the measurement of water depth can also encompass land height measurement.

The LADS systems contain measuring equipment that is mounted within an aircraft. Typically a fixed wing aircraft is used. During flight, the equipment measures over a vast area the depth at "sounding" positions. These sounding positions are typically in the form of a rectilinear grid pattern that has a 5 m×5 m grid spacing. Typical depth of water that can be measured by the systems is up to 70 m. The position of each sounding is determined with a Global Positioning System (GPS) and recorded with the associated measured depth. This "sounding" data is stored on appropriate media for later evaluation, e.g. digital tape.

The measuring equipment includes a laser that is pointed in a direction downward from the aircraft towards the water. The laser light is pulsed and directed to a sounding position by a primary mirror. Oscillating this mirror about two axes whilst the aircraft is flying creates the grid pattern of sounding on water. The spacing between the soundings also depends on the aircraft altitude, the aircraft forward speed, the frequency, and amplitude of oscillation of the primary mirror and the pulse rate of the laser. Due to design constraints of the LADS system, the primary mirror has a relatively large moment of inertia, which limits the rate at which the primary mirror can be oscillated. This limits the minimum spacing that can be achieved between laser soundings.

It is an object of the present invention to provide for a LADS system that reduces the spacing that can be achieved between laser soundings.

It is a further object of the present invention provide an improved LADS system that reduces the spacings between soundings by introducing a secondary mirror that can be oscillated at a much faster rate.

SUMMARY OF THE INVENTION

Therefore in one form of the invention there is proposed an apparatus for the measurement of water depth between a water surface and water bottom said apparatus adapted to be mounted on a flying platform above the water surface and including;

a transmitter and a receiver of laser light said laser light having at least one wavelength;

a primary mirror adapted to oscillate in at least one axis so as to direct laser light to the water in a pattern and further adapted to receive reflections of the laser light from the water surface and the water bottom and direct said received light to said receiver;

a secondary mirror positioned in between said transmitter of laser light and the primary mirror and adapted to oscillate in at least one axis so as to direct the laser light across at least a part of the surface of the primary mirror.

Preferably the primary mirror is adapted to oscillate in two orthogonal axis.

In preference the primary mirror is of an elongate construction, said secondary mirror directing the laser light across the primary mirror in its elongate direction.

In preference the secondary mirror is oscillated at a frequency faster that the oscillation frequency of the primary mirror.

In preference the secondary mirror is oscillated at a frequency that is an integral multiple of the oscillation frequency of the primary mirror.

In preference the secondary mirror is adapted to oscillate in a step-like fashion.

Preferably the laser light has at least two wavelengths, one wavelength suitable for reflection from the water surface, the other wavelength suitable for transmission through water.

In preference the secondary mirror is oscillated around an axis parallel to at least one axis of said primary mirror.

In preference the oscillation of the secondary mirror is caused by a galvanic driver mechanism.

In a further form of the invention there is proposed a method of measuring water depth between a water surface and a water bottom using a laser, a primary mirror, a secondary mirror, a receiver and a computational device located in an aircraft said method including the steps of:

driving said laser to project a light;

directing said light to a secondary mirror;

reflecting said light from said secondary to said primary mirror;

reflecting said light from the primary mirror to the water surface wherein some of said light is reflected from said water surface, and some other light passing through said water surface and being reflected from said water bottom;

reflecting said light reflected from said water surface and said water bottom from the primary mirror into the receiver wherein said light is converted into an electrical signal;

using said computational device to calculate the time difference between light reflected from said water surface and said water bottom and convert that into a measured water depth.

Preferably said method further includes the steps of flying the aircraft in a direction:

oscillating the primary mirror around an axis parallel to the aircraft direction;

oscillating said secondary mirror so as to cause the laser light to be reflected onto the primary mirror from the secondary mirror in a pattern that is approximately orthogonal to the major axis of rotation of the primary mirror.

In preference the secondary mirror is oscillated at a rate equal to or greater than the rate of rotation of the primary mirror around its major axis.

In preference the rate of oscillation of said secondary mirror is an integer multiple of the rate of oscillation of the primary mirror around its major axis.

In preference the laser includes light of two wavelengths, one said wavelength used to measure the mean height of the aircraft above the water surface.

In preference the amplitude and frequency of oscillation of the secondary mirror is calculated from a desired sounding spacing, aircraft height, aircraft speed and the amplitude and frequency of oscillation of the primary mirror.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Typically mounted in an aircraft the LADS system fires two laser beams, an infrared laser beam, and a green laser beam. The infrared laser beam is directed vertically downward from the system mounted in the aircraft. An infrared receiver inside the aircraft collects the light that is reflected from the surface of the water. For all transmitted pulses the aircraft height above the mean sea surface level is measured from the time taken for the infrared light to travel from the aircraft to the water surface and back to the aircraft.

The green beam is generally reflected from both the water surface and the bottom of the water floor dependant on sea surface state and water depth with the reflected light collected by a green receiver inside the aircraft. The depth of the water is calculated from the time difference between paths that the green laser beam travels to/from the surface and the bottom.

During a survey, the primary oscillating mirror directs the outgoing and incoming green laser beam typically 20 degrees either side of vertical, in the transverse direction to the flight path. The mirror also directs the green laser beam parallel to the flight path to compensate for the forward speed of the aircraft.

Figure 1:
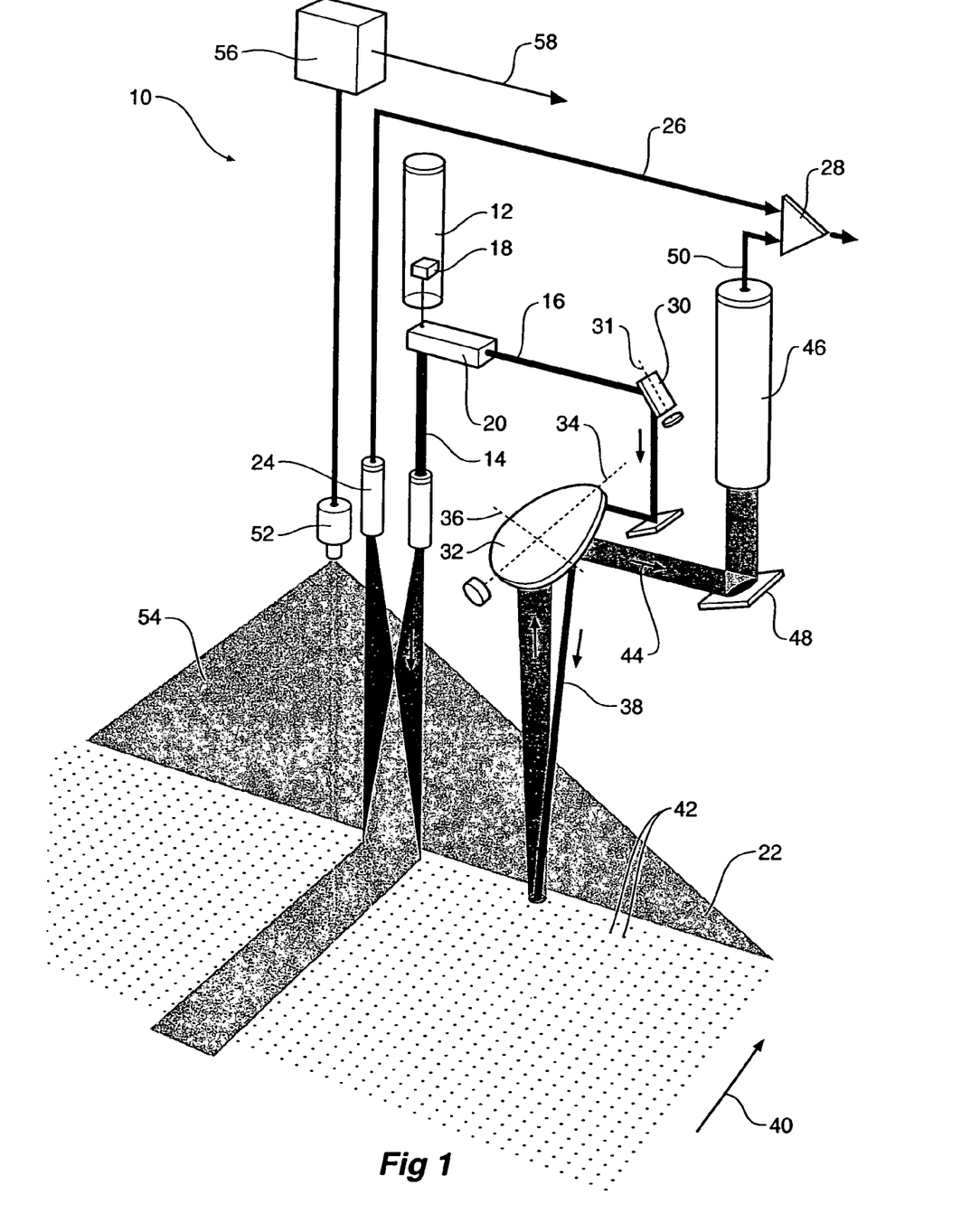
FIG. 1 is a schematic illustration of the LADS system embodying the present invention.

The typical components of the system are illustrated in FIG. 1. The system 10 includes a laser 12 such as a Nd:YAG laser that produces an infrared laser beam 14 and a green beam 16, the latter produced using a frequency doubler 18 and passing though an optical coupler 20. The infrared laser beam 14 is reflected from the ocean surface 22 and is received by an infrared receiver 24. An infrared return signal 26 is then passed to a digitiser 28 for analysis.

The green laser beam 16 is directed to a secondary mirror (also called the delta or dithering mirror) 30, which oscillates around one axis 31 and directs the green laser beam 16 across the surface of the primary or scanning mirror 32. The primary mirror typically rotates around two axes, the major and the minor axis 34 and 36 respectively and is of elongate pear shaped construction so that it facilitates both transmission and reception of the optical energy 38.

Oscillation about the major axis 34 of the primary mirror 32 is used to direct the scan of the green laser beam 16 transverse to the aircraft direction 40. Oscillation about the primary mirror minor axis 36 is used to compensate for the forward movement of the aircraft. If the forward motion of the aircraft were not compensated for, then the laser scan 42 produced would be a non-rectilinear pattern in a plane parallel to the platform roll direction rather than the rectilinear scan pattern.

The green laser light 44 is reflected both from the sea surface and the sea bottom and is re-directed by the primary mirror 32 to a green receiver 46 using other optical components such as mirror 48. The green receiver 46 includes a photo multiplier (mounted within the green receiver) that converts the received light to a signal 50 to be then used to calculate the water surface depth.

To assist the operator of the scanning assembly a video camera 52 observes the sea surface 54 and provides that to the operator through video equipment 56 to an operator console 58.

Rotation about the major axis 34 of the scanning mirror 32 produces a transverse scan that swings the outgoing beam and incoming reflections a maximum of 20 degrees either side of vertical. The forward scan, or rotation about the minor axis 36, swings the outgoing beam and incoming reflections a maximum of 0.5 degrees either side of vertical, typically at a rate of 18 Hz. The mirror 32 is a relatively large mirror to provide the necessary large field of view thereby limiting the oscillating rate about the major axis 34.

Figure 2:
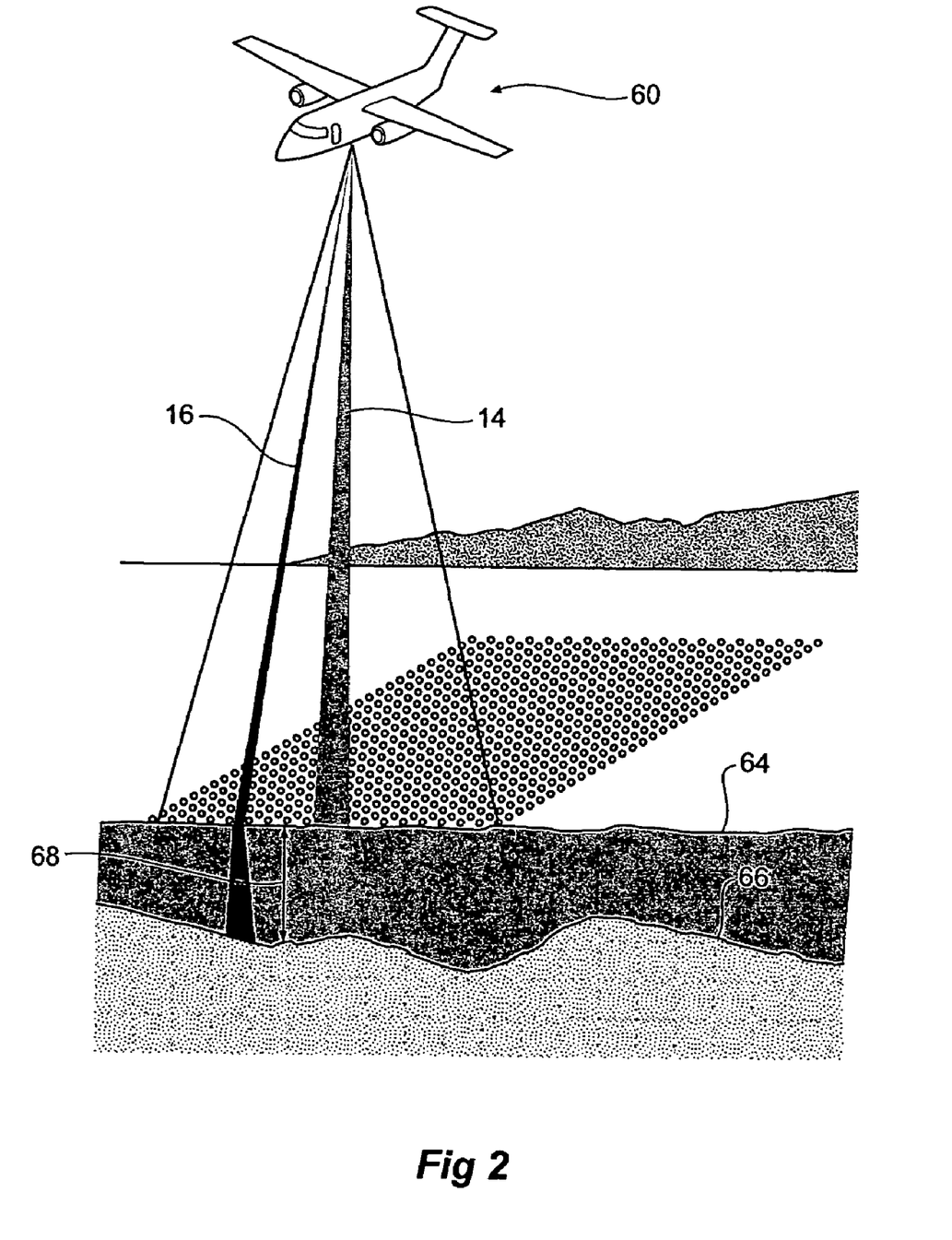
FIG. 2 is a schematic view of the LADS system in operation.
Figure 3:
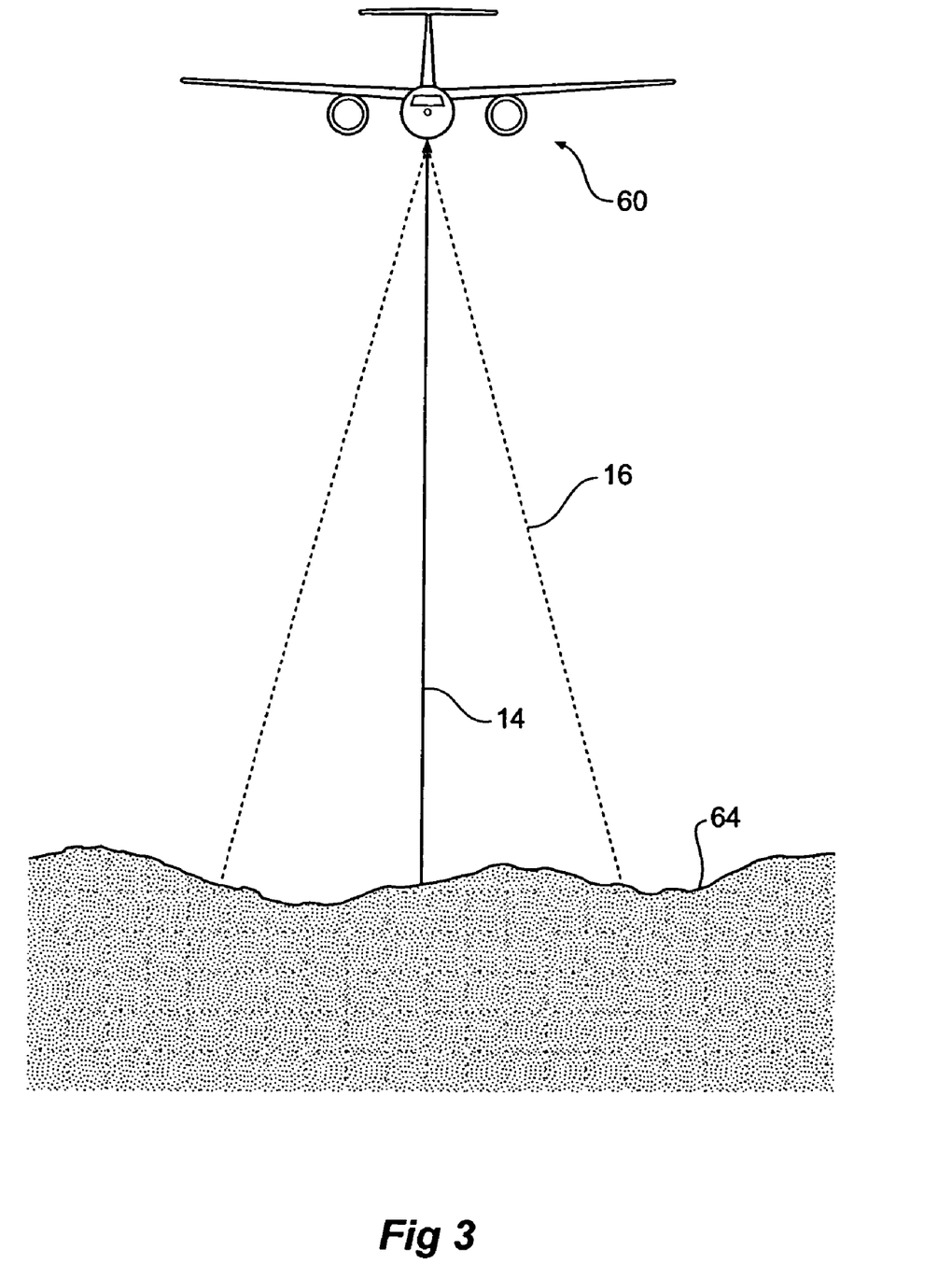
FIG. 3 is a schematic cross-sectional view of the LADS system in operation.

Shown in FIGS. 2 and 3 are conceptual illustrations of an aircraft using the LADS system. An aircraft 60 fires the two laser beams, an infrared laser beam 14 and a green laser beam 16.

The infrared laser beam 14 is directed vertically downward from the aircraft 60. The infrared receiver 24 inside the aircraft 60 collects the light that is reflected from the surface of the water 64. The aircraft height above the mean sea surface level is measured from the time taken for the infrared light to travel from the aircraft 60 to the water surface 64 and back to the aircraft 60.

The green beam 16 is reflected from both the water surface 64 and the bottom of the water floor 66 with the reflected light collected by a green receiver inside the aircraft 60. The depth 68 of the water is calculated from the time difference between paths that the green laser beam travels to/from the surface 64 and the bottom 66.

Figure 4:
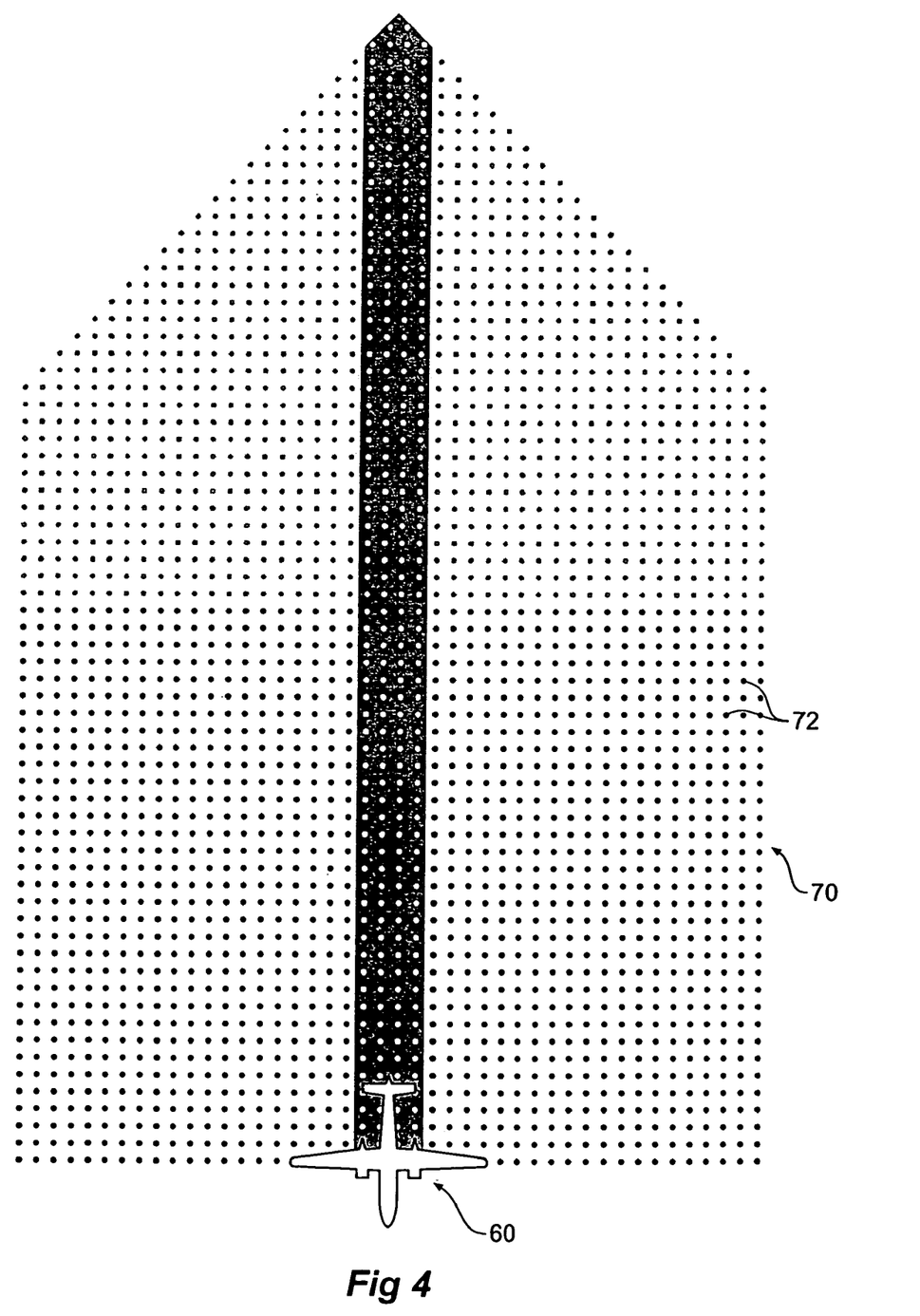
FIG. 4 is an illustration of the typical rectilinear sounding pattern in existing LADS systems.

As illustrated in FIG. 4, the typical survey using the LADS system generally creates a sounding pattern 70 that is 240 meters wide with soundings on a 5 m×5 m grid 72, when the aircraft 60 is flying at 175 knots at 1600 feet height. The LADS system can vary the amplitude and frequency of oscillation of the primary mirror (discussed below) to suit other sounding patterns.

During a survey, the primary oscillating mirror 32 directs the outgoing and incoming green laser beam 16 typically 20 degrees either side of vertical, in the transverse direction to the flight path. The mirror also directs the green laser beam 16 parallel to the flight path 40 to compensate for the forward speed of the aircraft 60.

As mentioned above, to produce a rectilinear or symmetrical scan pattern the system must compensate for the forward movement of the airborne platform by oscillating the scanner mirror 32 about the minor scan axis 36, typically rotating slowly in one direction and snapping back quickly in the other.

As one of the primary mirror's functions is to direct the green laser beam into the relatively large aperture of the green receiver 46 it must be a relatively large mirror.

The relatively large size of the primary mirror 32 with its relatively large mass and moment of inertia physically limits the amplitude and frequency that the primary mirror can be oscillated at. This limitation limits the minimum sounding spacing 72 that can be achieved.

The secondary mirror 30 is hence provided in the transmitted green laser beam path that provides the capability to reduce the sounding spacing. This secondary mirror 30 dithers the transmitted green laser light beam 16, either parallel and/or transverse to the flight path 40, so that when it impacts the water surface 64 it still lies within the receiver field of view but the sounding spacing 72 is reduced.

Figure 5:
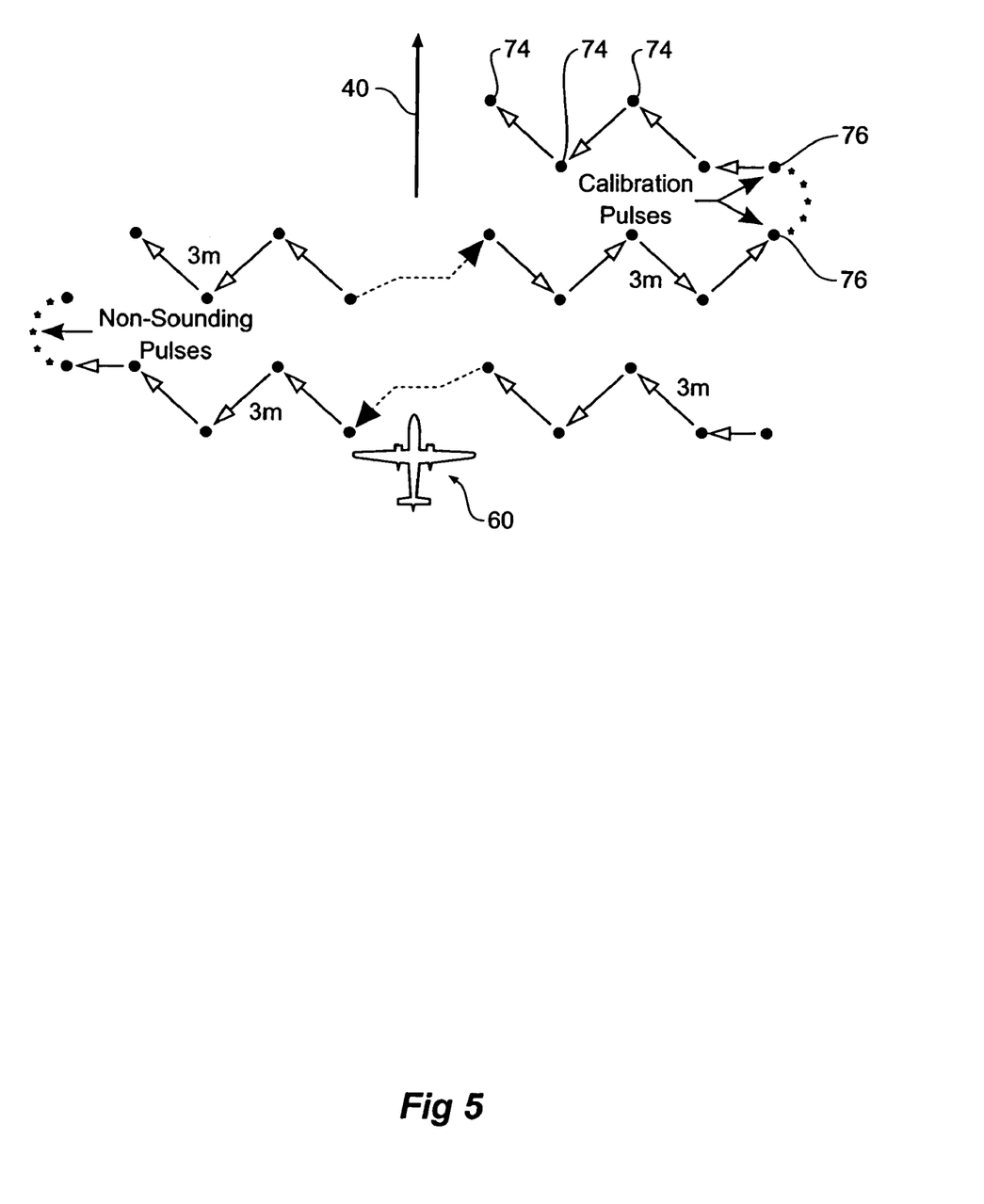
FIG. 5 is a scanning pattern according to the LADS system embodying the present invention.

The new sounding spacing is illustrated in FIG. 5 where the soundings 74 are now in a zigzag fashion in a direction transverse to the flight path 40. Using the secondary mirror 30 means that a sounding grid of typically 2 m×2 m or maybe even closer spacings can now be achieved instead of the 5 m×5 m pattern achieved using just the primary mirror 32.

As the secondary mirror 30 is located within the transmit path of the green laser beam 16, where the diameter of the beam is small, the secondary mirror 30 may be small and have small mass and moment of inertia. To achieve the required deflection of the transmitted laser beam, the secondary mirror 30 is required to move in small angles that are typically a few milliradians.

The small moment of inertia and small angular movement required of the secondary mirror 30 means that it could oscillate at a very fast rate. This rate can be much faster than that of the primary mirror 32. By oscillating the secondary mirror 30 at a fast rate it is possible to dither the green laser beam 16 within the receiver field of view. Consequently where the sounding spacings were previously limited by the physical attributes of the primary mirror 32, the sounding spacings 74 may now be reduced by incorporating the secondary mirror 30 as described. Thus, the spacing between each of the scans may now be 3 meters whereas beforehand it was limited to 5 meters, the limit dependent on the mechanical attributes of the primary mirror.

To assist in calibration of the system, when the primary mirror 32 is rotating around its minor axis 36 the returned pulses 76 are used for calibration and are non-sounding pulses.

The oscillation of the secondary mirror 30 may be achieved using known current technology. For example, an electromechanical or fluid powered actuator may achieve the oscillation with associated mirror sensors and drive controls. The mirror may have step like or continuous type oscillatory motion.

An alternative implementation for the secondary mirror 30 may include an array of micro miniature mirrors on a common substrate that are electrically driven. Other possible implementations may include a small mirror mounted to a galvanometer type motor or a piezo electric actuator.

Those skilled in the art will appreciate that the secondary or dithering mirror 30 doubles the effective scan rate 70 along the track of the aircraft 40 since it is tied to the frequency of the laser pulse. A tighter sounding may be achieved than with just a primary mirror 32.

It is to be further understood that the orientation of the dithering mirror to the primary mirror can be selected so that the dither is not parallel to one of the axis of rotation of the primary mirror. This will of course result in soundings that are not of a rectangular configuration and where soundings are not of a linear relationship. At times this may be desirable, especially if, for example, one may wish for the resolution in one direction to be greater than the other such as may be the case when one is mapping a narrow longitudinal channel. Given information on the relative orientation of the dither axis to the primary mirror, the soundings can be accurately positioned by appropriate computer processing.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but embraces any and all equivalent devices and apparatus.

The invention claimed is:

1. An apparatus for the measurement of water depth between a water surface and water bottom, said apparatus adapted to be mounted on a flying platform above the water surface and including:
   a transmitter and a receiver of laser light said laser light having at least one wavelength
   a primary mirror adapted to oscillate back and forth in at least one axis so as to direct laser light to the water in a pattern and further adapted to receive reflections of the laser light from the water surface and the water bottom and direct said reflections of the laser light to said receiver;
   a secondary mirror positioned in between said transmitter of laser light and the primary mirror and adapted to oscillate back and forth in at least one axis so as to direct the laser light across at least a part of the surface of the primary mirror.

2. The apparatus as in claim 1, wherein said primary mirror is adapted to oscillate in two orthogonal axes.

3. The apparatus as in claim 1, wherein said primary mirror is of an elongate construction, said secondary mirror directing the laser light across the primary mirror in its elongate direction.

4. The apparatus as in claim 1 wherein said secondary mirror is oscillated at a frequency faster than the oscillation frequency of the primary mirror.

5. The apparatus as in claim 4 wherein said secondary mirror is oscillated at a frequency that is an integral multiple of the oscillation frequency of the primary mirror.

6. The apparatus as in claim 1, wherein said secondary mirror is adapted to oscillate in a step-like fashion.

7. The apparatus as in claim 1 wherein said laser light has at least two wavelengths, one wavelength suitable for reflection from the water surface, the other wavelength suitable for transmission through water.

8. The apparatus as in claim 1, wherein said secondary mirror is oscillated around an axis parallel to at least one axis of said primary mirror.

9. The apparatus as in claim 1, wherein the oscillation of the secondary mirror is caused by a galvanic driver mechanism.

10. A method of measuring water depth between a water surface and a water bottom using a laser, an oscillating primary mirror, an oscillating secondary mirror, a receiver and a computational device located in en aircraft, said method including the steps of:
   driving said laser to project a light;
   directing said light to the secondary mirror, reflecting said light from said secondary to said primary mirror;

reflecting said light from the primary mirror to the water surface, wherein some of said right is reflected from said water surface and some other light passing through said water surface and being reflected from said water bottom;

reflecting said light reflected from said water surface and said water bottom from the primary mirror into the receiver wherein said light is converted into an electrical signal;

using said computational device to calculate the time difference between light reflected from said water surface and said water bottom and converting that into a measured water depth.

11. The method of measuring water depth as in claim 10, wherein said aircraft is being flown in a direction, said method further including the steps of:

oscillating the primary mirror around an axis parallel to the aircraft direction;

oscillating said secondary mirror so as to cause the laser light to be reflected onto the primary mirror from the secondary mirror in a pattern that is approximately orthogonal to the axis of rotation of the primary mirror.

12. The method of measuring water depth as in claim 10, wherein said secondary mirror is oscillated at a rate equal to or greater than the rate of rotation of the primary mirror around its axis.

13. The method of measuring water depth as in claim 12 wherein said rate of oscillation of said secondary mirror is an integer multiple of the rate of oscillation of the primary mirror around its axis.

14. The method of measuring water depth as in claim 10, wherein said laser includes light of two wavelengths, one said wavelength used to measure the mean height of the aircraft above the water surface.

15. The method of measuring water depth as in claim 10, wherein the amplitude and frequency of oscillation of the secondary mirror are. calculated from a desired sounding spacing, aircraft height, aircraft speed and the amplitude and frequency of oscillation of the primary mirror.

16. The method of measuring water depth as in claim 10 where said primary mirror is oscillated in two orthogonal axes, a major axis parallel to the aircraft direction and a minor axis orthogonal to the aircraft direction, and oscillating said secondary mirror so as to cause the laser light to be reflected onto the primary mirror from the secondary mirror in a pattern that is approximately orthogonal to the major axis of rotation of the primary mirror.

17. An apparatus for the measurement of water depth between a water surface and water bottom, said apparatus adapted to be mounted on a flying platform above the water surface and including:

a transmitter and a receiver of laser light said laser light having at least one wavelength a primary mirror adapted to oscillate back and forth in at least one axis so as to direct laser light to the water in a pattern and further adapted to receive reflections of the laser light from the water surface and the water bottom and direct said reflections of the laser light to said receiver;

a secondary mirror positioned in between said transmitter of laser light and the primary mirror and adapted to oscillate back and forth in at least one axis and within the field of view of the primary mirror so as to direct the laser light across at least a part of the surface of the primary mirror.

18. The apparatus as in claim 17, wherein said secondary mirror is oscillated at a frequency faster than the oscillation frequency of the primary mirror.

19. The apparatus as in claim 18 wherein said secondary mirror is oscillated at a frequency that is an integral multiple of the oscillation frequency of the primary mirror.

20. The method as in claim 11, wherein the step of oscillating the secondary mirror includes oscillating the secondary mirror within the field of view of the primary mirror.

* * * * *